(12) United States Patent
Catana Salazar et al.

(10) Patent No.: US 12,547,148 B2
(45) Date of Patent: Feb. 10, 2026

(54) DISPLACEMENT MAPS

(71) Applicant: Peridot Print LLC, Palo Alto, CA (US)

(72) Inventors: Juan Carlos Catana Salazar, San Diego, CA (US); Sergio Gonzalez Martin, Sant Cugat del Valles (ES); Jun Zeng, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 311 days.

(21) Appl. No.: 17/792,645

(22) PCT Filed: Jan. 17, 2020

(86) PCT No.: PCT/US2020/014134
§ 371 (c)(1),
(2) Date: Jul. 13, 2022

(87) PCT Pub. No.: WO2021/145892
PCT Pub. Date: Jul. 22, 2021

(65) Prior Publication Data
US 2023/0051312 A1    Feb. 16, 2023

(51) Int. Cl.
*G05B 19/4099* (2006.01)
*B33Y 50/00* (2015.01)
(Continued)

(52) U.S. Cl.
CPC .......... *G05B 19/4099* (2013.01); *B33Y 50/00* (2014.12); *G06T 15/04* (2013.01);
(Continued)

(58) Field of Classification Search
CPC ...... G05B 19/4099; G05B 2219/35134; B33Y 50/00; B33Y 50/02; G06T 15/04;
(Continued)

(56) References Cited

U.S. PATENT DOCUMENTS 10,234,848 B2   3/2019   Mehr et al.
2002/0158880 A1  10/2002  Williams et al.
(Continued)

FOREIGN PATENT DOCUMENTS

CN    102713671 A   10/2012
CN    107116139 A   9/2017
(Continued)

OTHER PUBLICATIONS

Hu, R., et al., "Approximate pyramidal shape decomposition", EPO Form 1703 01 .91 TRI ACM Transactions on Graphics, vol. 33, No. 6, Nov. 19, 2014, pp. 1-12.

*Primary Examiner* — Kamini S Shah
*Assistant Examiner* — Mohammed Shafayet
(74) *Attorney, Agent, or Firm* — Michael Dryja

(57) ABSTRACT

Examples of methods for determining displacement maps are described herein. In some examples of the methods, a method includes determining a displacement map for a
(Continued)

three-dimensional (3D) object model based on a compensated point cloud. In some examples, the method includes assembling the displacement map on the 3D object model for 3D manufacturing.

13 Claims, 7 Drawing Sheets

(51) Int. Cl.
    *G06T 15/04* (2011.01)
    *G06T 17/20* (2006.01)
    *G06T 19/20* (2011.01)
(52) U.S. Cl.
    CPC .............. *G06T 17/20* (2013.01); *G06T 19/20* (2013.01); *G05B 2219/35134* (2013.01); *G06T 2210/56* (2013.01); *G06T 2219/2008* (2013.01)
(58) Field of Classification Search
    CPC ..... G06T 17/20; G06T 19/20; G06T 2210/56; G06T 2219/2008; G06T 2219/2021; Y02P 10/25
    See application file for complete search history.

(56) References Cited

U.S. PATENT DOCUMENTS

| | | | |
|---|---|---|---|
| 2011/0205583 A1* | 8/2011 | Young | G06T 19/20 |
| | | | 358/1.15 |
| 2012/0256916 A1* | 10/2012 | Kitamura | G01S 17/89 |
| | | | 345/419 |
| 2016/0159011 A1 | 6/2016 | Marchione et al. | |
| 2016/0320771 A1* | 11/2016 | Huang | B33Y 50/00 |
| 2017/0269575 A1* | 9/2017 | Halperin | G06F 30/00 |
| 2017/0347120 A1 | 11/2017 | Chou et al. | |
| 2017/0372480 A1* | 12/2017 | Anand | G06F 30/20 |
| 2018/0095450 A1* | 4/2018 | Lappas | B33Y 10/00 |
| 2018/0307209 A1* | 10/2018 | Chin | B22F 10/28 |
| 2019/0054700 A1 | 2/2019 | Chandar et al. | |
| 2019/0122378 A1* | 4/2019 | Aswin | G06T 7/571 |
| 2019/0329499 A1* | 10/2019 | Parangi | B22F 10/80 |
| 2019/0377843 A1 | 12/2019 | Chen et al. | |

FOREIGN PATENT DOCUMENTS

| | | |
|---|---|---|
| CN | 109808183 A | 5/2019 |
| CN | 110570512 A | 12/2019 |

* cited by examiner

DISPLACEMENT MAPS

BACKGROUND

Three-dimensional (3D) solid parts may be produced from a digital model using 3D manufacturing. 3D manufacturing may be used in rapid prototyping, mold generation, mold master generation, and short-run manufacturing. Examples of 3D manufacturing include 3D printing. In some 3D manufacturing techniques, build material may be cured or fused.

DETAILED DESCRIPTION

Figure 1:
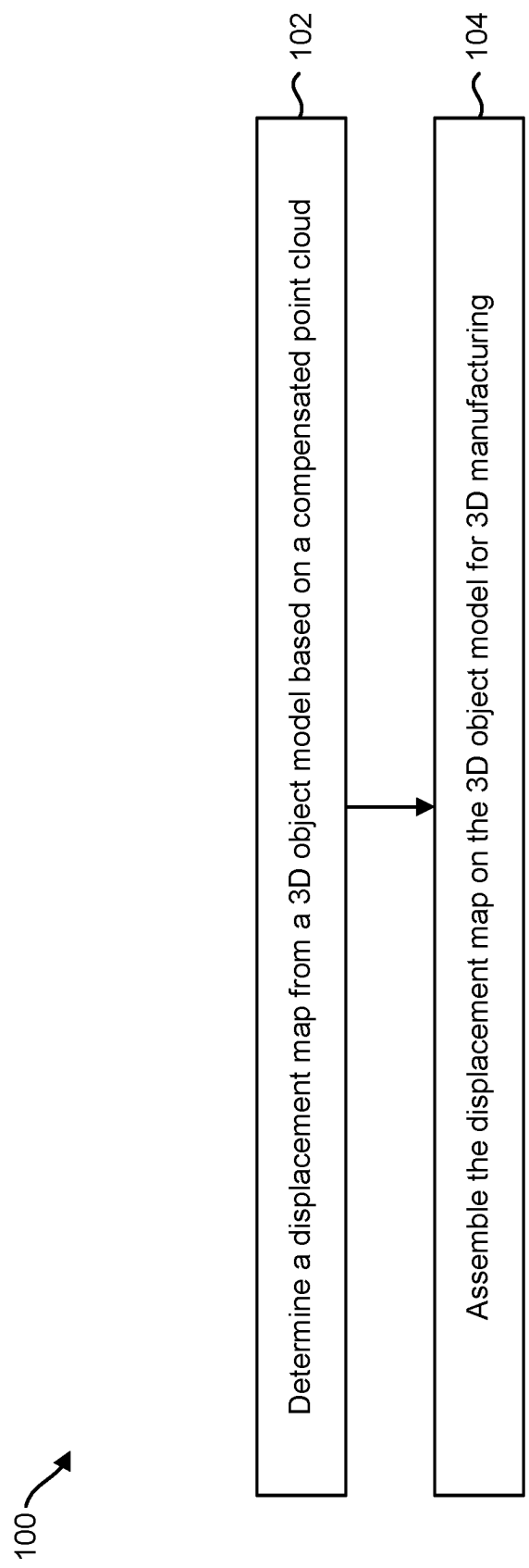
FIG. 1 is a flow diagram illustrating an example of a method for determining a displacement map or maps.

Three-dimensional (3D) manufacturing may be used to manufacture 3D objects. 3D printing is an example of 3D manufacturing. In some examples of 3D printing, thermal energy may be projected over material in a build area, where a phase change and solidification in the material may occur at certain voxels. A voxel is a representation of a location in a 3D space (e.g., a component of a 3D space). For instance, a voxel may represent a volume that is a subset of the 3D space. In some examples, voxels may be arranged on a 3D grid. For instance, a voxel may be cuboid or rectangular prismatic in shape. In some examples, voxels in the 3D space may be uniformly sized or non-uniformly sized. Examples of a voxel size dimension may include 25.4 millimeters (mm)/150≈170 microns for 150 dots per inch (dpi), 490 microns for 50 dpi, 2 mm, 4 mm, etc.

In some examples, the techniques described herein may be utilized for various examples of 3D manufacturing. For instance, some examples may be utilized for plastics, polymers, semi-crystalline materials, metals, etc. Some additive manufacturing techniques may be powder-based and driven by powder fusion. Some examples of the approaches described herein may be applied to area-based powder bed fusion-based additive manufacturing, such as Stereolithography (SLA), Multi-Jet Fusion (MJF), Metal Jet Fusion, metal binding printing, Selective Laser Melting (SLM), Selective Laser Sintering (SLS), liquid resin-based printing, etc. Some examples of the approaches described herein may be applied to additive manufacturing where agents carried by droplets are utilized for voxel-level thermal modulation.

In some examples of additive manufacturing, thermal energy may be utilized to fuse material (e.g., particles, powder, etc.) to form an object. For example, agents (e.g., fusing agent, detailing agent, etc.) may be selectively deposited to control voxel-level energy deposition, which may trigger a phase change and/or solidification for selected voxels. The manufactured object geometry may be driven by the fusion process, which enables predicting or inferring the geometry following manufacturing. Predicting or inferring the geometry may indicate predicted or inferred object deformation. Object deformation is a change or disparity in object geometry from a target geometry (e.g., 3D object model geometry). Object deformation may occur during manufacturing due to thermal diffusion, thermal change, gravity, manufacturing errors, etc. For example, uneven heating and/or cooling of temperatures of the material in manufacturing may produce objects with geometrical deformations. Geometrical deformations may be manifested by shrinkages (e.g., negative deformation) and/or expansions (e.g., positive deformation) over the object surface. In some examples, a deformation of an object may be computed by aligning a 3D object model and a scanned model with high (e.g., maximum) overlap and calculating a distance between both surfaces.

A 3D object model is a 3D geometrical model of an object. Examples of 3D object models include computer-aided design (CAD) models, mesh models, 3D surfaces, etc. In some examples, a 3D object model may include exterior polygons of an object (without interior polygons, for instance). For instance, a 3D object model may be expressed as a mesh of a surface (e.g., exterior polygons) of a 3D object. In some examples, a 3D object model may be utilized to manufacture (e.g., print) an object.

A variety of techniques may be utilized to predict or infer the geometry and/or deformation of a 3D object. In some examples, a manufacturing (e.g., printing) simulation may be utilized to compute the transient evolution of temperature history for each voxel with voxel-level thermo-mechanical properties. The thermally induced deformation may be calculated for a voxel and can be propagated throughout the build volume through boundary conditions applied to the voxel surface. Some techniques may be based on a thermal simulation that includes calculating object deformation that may occur in layer-by-layer manufacturing. Some techniques may be based on a machine learning approach (e.g., deep learning approach).

A machine learning model is a structure that learns based on training. Examples of machine learning models may include artificial neural networks (e.g., deep neural networks, convolutional neural networks (CNNs), dynamic graph CNNs (DGCNNs), etc.). Training the machine learning model may include adjusting a weight or weights of the machine learning model. For example, a neural network may include a set of nodes, layers, and/or connections between nodes. The nodes, layers, and/or connections may have associated weights. The weights may be adjusted to train the neural network to perform a function, such as predicting object geometry after manufacturing or object deformation.

Examples of the weights may be in a relatively large range of numbers, and may be negative or positive.

In some examples, a machine learning model (e.g., a deep neural network) may be utilized to predict object geometry of an object after manufacturing and/or to predict object deformation from a 3D object model (e.g., computer-aided design (CAD) model). For example, a machine learning model may provide a quantitative model for directly predicting object deformation. For instance, deep learning may be utilized to predict object deformation. A machine-learning model may be trained with scanned objects that were manufactured (e.g., scanned objects that were printed with a 3D printer).

In some examples, point clouds may be utilized to represent 3D objects and/or 3D object geometry. A point cloud is a set of points or locations in a 3D space. A point cloud may be utilized to represent a 3D object or 3D object model. For example, a 3D object may be scanned with a 3D scanner (e.g., depth sensor(s), camera(s), light detection and ranging (LIDAR) sensors, etc.) to produce a point cloud representing the 3D object (e.g., manufactured object, 3D printed object, etc.). The point cloud may include a set of points representing locations on the surface of the 3D object in 3D space. In some examples, a point cloud may be generated from a 3D object model (e.g., CAD model). For example, a random selection of the points from a 3D object model may be performed. For instance, a point cloud may be generated from a uniform random sampling of points from a surface of a 3D object model in some approaches. In some examples, a point cloud may be generated by uniformly projecting points over the surface of 3D object model mesh. For example, a uniform density of points over the whole surface or a constant number of points per triangle in the mesh may be generated in some approaches. A uniform projection may refer to selecting points (e.g., point pairs) within a threshold distance from each other. A point cloud may be an irregular structure, where points may not necessarily correspond to a uniform grid.

In some examples, a machine learning model may be utilized to predict a point cloud representing a manufactured object (before the object is manufactured, for instance). The machine learning model may predict the point cloud of the object (e.g., object deformation) based on a model point cloud of a 3D object model (e.g., CAD model). In some examples, each point of the model point cloud may be utilized and/or deformation prediction may be performed for all points of the model point cloud. In some examples, a subset of points of the model point cloud may be utilized and/or deformation prediction may be performed for the subset of points of the model point cloud.

Some machine learning approaches may utilize training data to predict or infer manufactured object deformation. The training data may indicate deformation that has occurred during a manufacturing process. For example, object deformation may be assessed based on a 3D object model (e.g., computer aided drafting (CAD) model) and a 3D scan of an object that has been manufactured based on the 3D object model. The object deformation assessment (e.g., the 3D object model and the 3D scan) may be utilized as a ground truth for machine learning. For instance, the object deformation assessment may enable deformation prediction and/or compensation. In order to assess object deformation, the 3D object model and the 3D scan may be registered. Registration is a procedure to align objects.

In some examples, a machine learning model may be trained using point clouds of 3D object models (e.g., computer-aided design (CAD) models) and point clouds from scans of corresponding 3D objects after manufacturing. For instance, a 3D object model or models may be utilized to manufacture (e.g., print) a 3D object or objects. A model point cloud or clouds may be determined from the 3D object model(s). A point cloud or point clouds may be obtained by scanning the manufactured 3D object or objects. In some examples, a ground truth for training the machine learning model may include the point cloud(s) after alignment to the model point clouds. In some examples, a ground truth for training the machine learning model may include a deformation point cloud or deformation point clouds, which may be calculated as a difference between 3D scanned point cloud(s) and 3D object model(s) point cloud(s). In some examples, a machine learning model may be trained with first point clouds from 3D object models and second point clouds from scanned objects.

In some examples, pairs of models (e.g., 3D object models and corresponding deformed models and/or scans) may be obtained using a simulation engine and/or a deep learning model. Pairs of models may be analyzed to quantify object deformation. For example, a 3D object model (and/or a point cloud of a 3D object model) may be compared with a corresponding deformed model or scan (e.g., deformation point cloud) to quantify the object deformation. In some examples, the quantification of object deformation may be utilized to train a deep neural network (e.g., to build a quantitative model) that predicts a compensated point cloud from the predicted or inferred geometry for a manufactured object.

A compensated point cloud is a point cloud that indicates a geometrical compensation, change, or adjustment. For example, a compensated point cloud may include points that indicate a geometrical compensation, change, or adjustment for respective points of a point cloud corresponding to a 3D object model. For instance, a geometrical compensation may be utilized to modify a 3D object model (e.g., input CAD model) to reduce and/or mitigate deformation for a manufactured object. In some examples, a quantitative model (e.g., a deep neural network) may be utilized to predict the compensated point cloud (and/or compensated 3D object model or CAD design) from the target geometry (e.g., 3D object model, model point cloud, mesh, etc.). Manufacturing (e.g., printing) an object according to the compensated point cloud may reduce and/or minimize flaws in the manufactured object geometry.

In some examples, a compensated point cloud may not be directly applicable to a 3D object model to manufacture the 3D object. For instance, the compensated point clouds may indicate some points of compensation or adjustment and may not indicate compensation or adjustment for a whole 3D object model. Accordingly, it may be beneficial to provide approaches for encoding the information of compensated point clouds into displacement maps. A displacement map is information that indicates a displacement or geometrical adjustment for a 3D object model (e.g., a whole 3D object model) or a portion (e.g., face, polygon, etc.) of a 3D object model. For example, a displacement map may be assembled on a 3D object model (e.g., on faces an input CAD object) for use in manufacturing (e.g., printing). For instance, by printing objects according to 3D object models with displacement maps, the actual deformation in manufacturing may be reduced and/or minimized to improve manufactured object geometry.

Some examples of the techniques described herein may provide approaches for geometrical compensation for shape deformation of manufactured objects (e.g., 3D printed objects). In some examples, the geometrical compensation may be expressed as point clouds (e.g., point clouds predicted or inferred based on a deep leaning approach). In some examples, the deformation or compensation information may be expressed as a compensated point cloud. The compensated point cloud may be encoded into a displacement map. For example, a compensated point cloud may be utilized to indicate a compensated region or regions of 3D object model. A compensated point cloud may indicate a geometric adjustment to reduce or mitigate deformation. In some examples, a compensated point cloud may be encoded to a displacement map. In some examples, a displacement map may be expressed as a digital texture or textures. The digital texture(s) may be assembled on a 3D object model for 3D manufacturing.

Throughout the drawings, identical or similar reference numbers may designate similar, but not necessarily identical, elements. The figures are not necessarily to scale, and the size of some parts may be exaggerated to more clearly illustrate the example shown. Moreover, the drawings provide examples and/or implementations in accordance with the description; however, the description is not limited to the examples and/or implementations provided in the drawings.

FIG. 1 is a flow diagram illustrating an example of a method 100 for determining a displacement map or maps. The method 100 and/or an element or elements of the method 100 may be performed by an apparatus (e.g., electronic device). For example, the method 100 may be performed by the apparatus 302 described in connection with FIG. 3.

The apparatus may determine 102 a displacement map from a 3D object model based on a compensated point cloud. As described above, a compensated point cloud may indicate a geometrical compensation, change, or adjustment. In some approaches, a compensated point cloud may be predicted or inferred using a machine learning model. For example, a machine learning model may be trained to understand a relationship between 3D object models and deformations that occur in manufacturing. The machine learning model may be utilized to predict or infer a compensated point cloud based on a 3D object model. For instance, the 3D object model may be utilized to represent the target object geometry after manufacturing. The machine learning model may be utilized to predict or infer a compensated point cloud to compensate for anticipated deformation such that applying geometrical compensation to the 3D object model may result in the target object geometry after manufacturing. In some examples, the apparatus may produce a compensation prediction that it is structured as a point cloud of a compensated 3D object model based on a model point cloud of the 3D object model (e.g., a 3D object model with the target object geometry).

In some examples, an approach or approaches may be utilized to generate a compensated point cloud. For example, iterative prediction, iterative simulation, and/or manual adjustment may be approaches to produce a compensated point cloud. In some approaches, the apparatus may perform iterative prediction. For instance, the apparatus may predict object deformation using a 3D object model, may adjust the 3D object model (e.g., the placement of a fusing voxel or voxels), and may repeat predicting object deformation using the adjusted 3D model. Adjustments that reduce predicted object deformation may be retained and/or amplified. Adjustments that increase predicted object deformation may be reversed and/or reduced. This procedure may iterate until the predicted deformation is reduced to a target amount.

In some examples, the compensated point cloud may be expressed as a set of values. For example, a compensated point cloud may include coordinates (e.g., x, y, and z coordinates) for a set of compensated points. In some examples, the compensated point cloud may include compensated points and other associated information. For instance, a compensated point cloud may include coordinates (e.g., x, y, and z coordinates) of the compensated point cloud, coordinates (e.g., x, y, and z coordinates) of a model point cloud (e.g., a point cloud of the 3D object model), and/or compensation distances. A compensation distance is a distance between a compensated point in the compensated point cloud and a corresponding point in the model point cloud. In some examples, the compensated point cloud may include normal values (e.g., x, y, and z values of a normal vector for each point in the model point cloud and/or x, y, and z values of a normal vector for each compensated point in the compensated point cloud).

As described above, a displacement map may indicate a displacement or geometrical adjustment for a 3D object model. In some examples, a displacement map may include polygons (e.g., triangles, n-sided polygons, etc.) that correspond to polygons of the 3D object model. Each polygon in the displacement map may indicate a displacement for a corresponding polygon of the 3D object model. In some examples, the displacement map may be a two-dimensional (2D) space (e.g., 2D unit space), where each 3D polygon and/or point of the 3D object model (e.g., each exterior 3D polygon and/or point of the 3D object model) may be mapped. For example, 3D polygons and/or points of the 3D object model may be mapped to the 2D space while maintaining polygon interiors as disjoint regions and/or without disturbing corresponding aspect ratios. In some examples, the apparatus may determine 102 a displacement map by mapping polygon(s) of the 3D object model to a 2D space and determining displacement(s) for the polygon(s) based on the compensated point cloud.

In some examples, determining 102 the displacement map may include mapping the 3D object model to a 2D space. For example, the 3D object model (e.g., polygons and/or points of the 3D object model) may be mapped to the 2D space by projecting and/or unwrapping the 3D object model (e.g., polygon mesh) into the 2D space. For instance, the apparatus may perform UV projection of the 3D object model into the 2D space, where U denotes an axis (e.g., horizontal axis) of the 2D space, and V denotes another axis (e.g., vertical axis) of the 2D space. In some examples, mapping the 3D object model to the 2D space may include assigning a coordinate in the 2D space for each vertex of the 3D object model (e.g., CAD mesh). In some examples, the 2D space may be a 2D unit space. A 2D unit space may have equal dimensions (e.g., U and V dimensions) of a unit value.

In some examples, determining 102 the displacement map may include mapping the compensated point cloud to the 2D space to produce a mapped point cloud. For instance, the same mapping or a similar mapping (e.g., projection, unwrapping, etc.) that is used to map the 3D object model into the 2D space may be utilized to map the compensated point cloud into the 2D space. For example, each compensated point in the compensated point cloud may correspond to a point in the model point cloud, and each point in the model point cloud may correspond to a polygon of the 3D object model. Accordingly, each compensated point in the compensated point cloud may correspond to, or may be associated with, a polygon of the 3D object model. For instance, a mapping (e.g., projection, unwrapping, etc.) that is utilized to map a polygon of the 3D object model into the 2D space may also be applied to the compensated point(s) that correspond to that polygon to map the compensated point(s) into the 2D space. This may be performed for each polygon (e.g., each exterior polygon) of the 3D object model. Applying the same or similar mapping to the compensated point cloud may enable producing a displacement map with the predicted deformation of the compensated 3D object model.

In some examples, determining 102 the displacement map may include polygonizing (e.g., triangulating) points of the mapped point cloud. For example, the apparatus may polygonize points of the mapped point cloud corresponding to a mapped polygon from the 3D object model in the 2D space. Polygonizing may include connecting points (e.g., the compensated points from the compensated point cloud) with lines to form polygons (e.g., triangles). For instance, the apparatus may polygonize compensated points within a polygon by connecting compensated points with lines to form polygons within the polygon. The compensated points may be connected using a criterion or criteria (e.g., distance between points, nearest neighboring points, number of polygon sides allowed, angle between lines, etc.). For instance, 3 nearest neighboring points may be connected that increase or maximize internal angles. Polygonization may be utilized to populate the displacement map to cover entire polygon surface(s) based on the compensated points inside the polygon(s). For instance, polygonization may be utilized for interpolating displacement over a polygon or polygons.

In some examples, determining 102 the displacement map may include triangulating points of the mapped point cloud corresponding to a mapped polygon from the 3D object model in the 2D space. For example, the apparatus may perform Delaunay triangulation inside each polygon (e.g., triangle) area. In some approaches, Delaunay triangulation may be beneficial because Delaunay triangulation may maximize minimum angles in the triangles, which may avoid unnecessarily elongated triangles. Delaunay triangulation may also be beneficial because nearest points may be connected by an edge of the triangulation, which may better represent compensation and/or deformation, since deformation at a point may be influenced by neighboring areas. In some examples, the triangulation may produce triangles on the displacement map (e.g., on or in the 2D space corresponding to the 2D mapping).

In some examples, determining the displacement map may include interpolating the polygonization (e.g., triangulation). For example, each compensated point in the compensated point cloud may indicate information of a compensation and/or deformation (e.g., distance and/or direction) at that compensated point. The compensation and/or deformation may be predicted or inferred. In some examples, the compensated points inside each polygon (e.g., triangle) may be utilized as a deformation proxy subset. The deformation proxy subset of points may be utilized to perform an interpolation based on the polygonization (e.g., Delaunay triangulation) on each mesh polygon. In some examples, the interpolation on a polygonization (e.g., triangulation) may treat each polygon as an independent plane. Accordingly, interpolated values may be continuous across the polygonization. In some examples, derivatives may be discontinuous at the edges between polygons (e.g., triangles). In some examples, each point inside a polygon (e.g., projected mesh triangle) may include a compensated value. To compensate over a surface (e.g., a continuous space) inside a polygon (e.g., Delaunay triangle), the apparatus may linearly interpolate using three compensated values (corresponding to points or vertices that define the triangle, for instance) to create a compensated field (e.g., interpolated values, surface, area, etc.).

In some examples, the displacement map may include a set of polygons. Each polygon may include an interpolation of a set of compensated points of the compensated point cloud. For example, determining 102 the displacement map may include polygonizing each mapped polygon, and interpolating each polygonized polygon. In some examples, the interpolation may indicate a varying degree of compensation over a corresponding polygon.

The apparatus may assemble 104 the displacement map on the 3D object model for 3D manufacturing. In some examples, assembling 104 the displacement map on the 3D object model may include mapping the displacement map to the 3D object model as a texture. For instance, the displacement map may be utilized as a digital texture. The displacement map may be wrapped on and/or attached to the 3D object model. In some examples, each polygon of the displacement map (with corresponding interpolated values) may be mapped to the corresponding polygon of the 3D object model. For instance, a transformation (e.g., projection, rotation, translation, scaling, etc.) may be utilized to align each polygon of the displacement map with the corresponding polygon of the 3D object model. For instance, a reverse mapping (from the mapping utilized to map the polygon into the 2D space) may be utilized to map a polygon of the displacement map (with the interpolated values) back to the 3D object model.

In some examples, the method 100 may include manufacturing (e.g., printing) the 3D object model with the displacement map. For example, the apparatus may print the 3D object model with the displacement map and/or may send the 3D object model with the displacement map to a 3D printer to print the 3D object.

In some examples, the apparatus may provide the displacement map (with or without the 3D object model). For instance, the apparatus may store the displacement map, may send the displacement map to another device, and/or may present the displacement map (on a display and/or in a user interface, for example). In some examples, the apparatus may utilize the displacement map to compensate for the predicted deformations. For instance, the apparatus may adjust the 3D object model (e.g., CAD model) and/or printing variables (e.g., amount of agent, thermal exposure time, etc.) to reduce or avoid the predicted deformation. In some examples, a 3D printer may print the adjusted (e.g., deformation-reduced and/or improved) 3D model.

Figure 2:
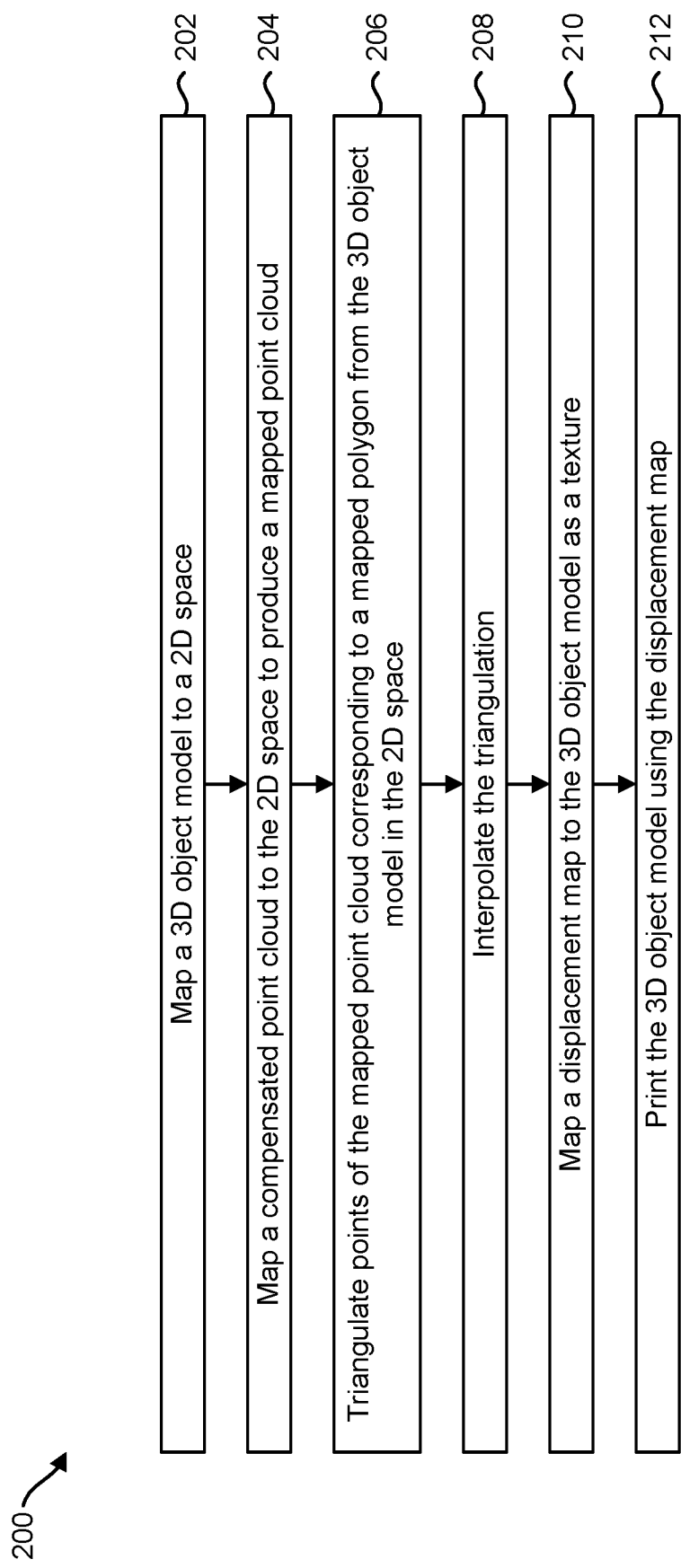
FIG. 2 is a flow diagram illustrating another example of a method for determining a displacement map or maps.

FIG. 2 is a flow diagram illustrating another example of a method 200 for determining a displacement map or maps. The method 200 and/or an element or elements of the method 200 may be performed by an apparatus (e.g., electronic device). For example, the method 200 may be performed by the apparatus 302 described in connection with FIG. 3.

The apparatus may map 202 a 3D object model to a 2D space. In some examples, mapping 202 the 3D object model to a 2D space may be performed as described in relation to FIG. 1. For instance, the apparatus may transform (e.g., project and/or unwrap) the 3D object model to a 2D space. For instance, the apparatus may utilize UV projection to project each 3D mesh triangle to a 2D unit space. In some examples, the apparatus may receive the 3D object model from another device (e.g., linked device, networked device, removable storage, etc.) or may generate the 3D object model.

The apparatus may map 204 a compensated point cloud to the 2D space to produce a mapped point cloud. In some examples, mapping 204 the compensated point cloud to the 2D space may be performed as described in relation to FIG.

1. For instance, the apparatus may apply the same or a similar mapping to the compensated point cloud as applied to the map 202 the 3D object model. In some examples, the apparatus may receive the compensated point cloud from another device (e.g., linked device, networked device, removable storage, etc.) or may generate the compensated point cloud.

The apparatus may triangulate 206 points of the mapped point cloud corresponding to a mapped polygon from the 3D object model in the 2D space. In some examples, triangulating 206 the points of the mapped point cloud may be performed as described in relation to FIG. 1. For example, the apparatus may perform Delaunay triangulation based on the points for each mapped polygon in the 2D space.

The apparatus may interpolate 208 the triangulation. In some examples, interpolating 208 the triangulation may be performed as described in relation to FIG. 1. For example, the apparatus may interpolate the points from the mapped point cloud over each triangle based on the triangulation. Interpolating 208 the triangulation for each triangle in the 2D space may produce the displacement map.

The apparatus may map 210 a displacement map to the 3D object model as a texture. In some examples, mapping 204 the compensated point cloud to the 2D space may be performed as described in relation to FIG. 1.

The apparatus may print 212 the 3D object model using the displacement map. In some examples, printing 212 the 3D object model using the displacement map may be performed as described in relation to FIG. 1.

In some examples, the apparatus may provide the displacement map. For example, providing the displacement map may be performed as described in relation to FIG. 1. For instance, the apparatus may store the displacement map, may send the displacement map to another device, and/or may present the displacement map (on a display and/or in a user interface, for example). For instance, the apparatus may present (on a display and/or user interface, for example) the displacement map superimposed on the 3D object model and/or may indicate a point or points (e.g., portions) of predicted object compensation. In some examples, operation(s), function(s), and/or element(s) of the method 200 may be omitted and/or combined.

Figure 3:
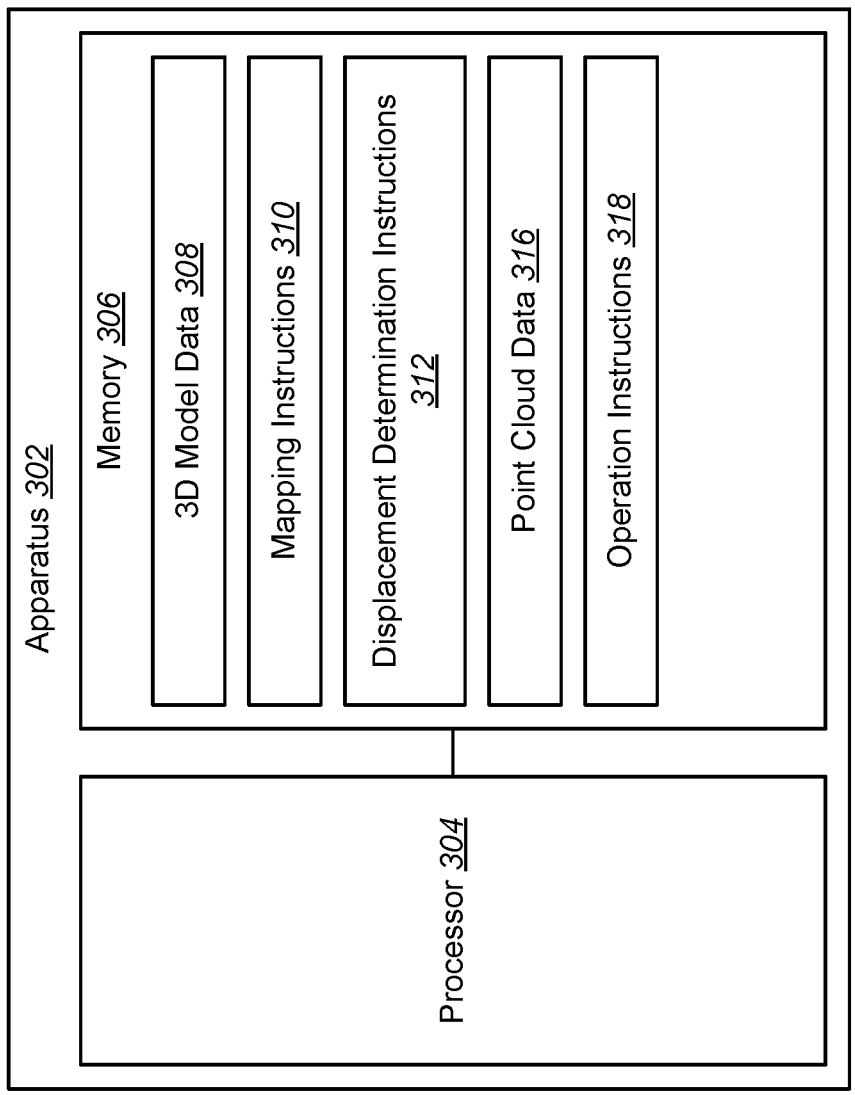
FIG. 3 is a block diagram of an example of an apparatus that may be used in determining displacements.

FIG. 3 is a block diagram of an example of an apparatus 302 that may be used in determining displacements. The apparatus 302 may be a computing device, such as a personal computer, a server computer, a printer, a 3D printer, a smartphone, a tablet computer, etc. The apparatus 302 may include and/or may be coupled to a processor 304, and/or a memory 306. The processor 304 may be in electronic communication with the memory 306. In some examples, the apparatus 302 may be in communication with (e.g., coupled to, have a communication link with) a manufacturing device (e.g., a 3D printing device). In some examples, the apparatus 302 may be an example of a 3D printing device. The apparatus 302 may include additional components (not shown) and/or some of the components described herein may be removed and/or modified without departing from the scope of this disclosure.

The processor 304 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. The processor 304 may fetch, decode, and/or execute instructions (e.g., mapping instructions 310 and/or displacement determination instructions 312) stored in the memory 306.

In some examples, the processor 304 may include an electronic circuit or circuits that include electronic components for performing a functionality or functionalities of the instructions (e.g., mapping instructions 310 and/or displacement determination instructions 312). In some examples, the processor 304 may perform one, some, or all of the functions, operations, elements, methods, etc., described in connection with one, some, or all of FIGS. 1-7B.

The memory 306 may be any electronic, magnetic, optical, or other physical storage device that contains or stores electronic information (e.g., instructions and/or data). Thus, the memory 306 may be, for example, Random Access Memory (RAM), Electrically Erasable Programmable Read-Only Memory (EEPROM), a storage device, an optical disc, and the like. In some implementations, the memory 306 may be a non-transitory tangible machine-readable storage medium, where the term "non-transitory" does not encompass transitory propagating signals. The memory 306 may store data and/or executable code (e.g., instructions).

In some examples, the apparatus 302 may also include a data store (not shown) on which the processor 304 may store information. The data store may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the memory 306 may be included in the data store. In some examples, the memory 306 may be separate from the data store. In some approaches, the data store may store similar instructions and/or data as that stored by the memory 306. For example, the data store may be non-volatile memory and the memory 306 may be volatile memory.

In some examples, the apparatus 302 may include an input/output interface (not shown) through which the processor 304 may communicate with an external device or devices (not shown), for instance, to receive and store the information pertaining to the objects for which displacements and/or displacement maps may be determined. The input/output interface may include hardware and/or machine-readable instructions to enable the processor 304 to communicate with the external device or devices. The input/output interface may enable a wired or wireless connection to the external device or devices. In some examples, the input/output interface may further include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions into the apparatus 302. In some examples, the apparatus 302 may receive 3D model data 308 and/or point cloud data 316 from an external device or devices (e.g., 3D scanner, removable storage, network device, etc.).

In some examples, the memory 306 may store 3D model data 308. The 3D model data 308 may be generated by the apparatus 302 and/or received from another device. Some examples of 3D model data 308 include a 3MF file or files, a 3D computer-aided design (CAD) image, object shape data, mesh data, geometry data, etc. The 3D model data 308 may indicate the shape of a 3D object model or models.

In some examples, the memory 306 may store point cloud data 316. The point cloud data 316 may be generated by the apparatus 302 and/or received from another device. Some examples of point cloud data 316 include a point cloud or point clouds generated from the 3D model data 308, a point cloud or point clouds from a scanned object or objects, and/or a predicted point cloud or point clouds. For example, the processor 304 may determine a model point cloud from a 3D object model indicated by the 3D model data 308. The model point cloud may be stored with the point cloud data 316. In some examples, the apparatus may receive compensation point cloud(s) from another device (e.g., linked device, networked device, removable storage, etc.) or may determine the compensation point cloud(s), which may be stored as point cloud data 316. In some examples, the apparatus 302 may determine the compensation point cloud(s) using a machine learning model or models.

The memory 306 may store mapping instructions 310. The processor 304 may execute the mapping instructions 310 to generate a graph. For instance, the processor 304 may execute the mapping instructions 310 to map polygons of a 3D object model and points (e.g., compensated points) of a compensated point cloud to a 2D space. In some examples, the processor 304 may map polygons of a 3D object model from the 3D model data 308 and/or may map points of a compensated point cloud from the point cloud data 316. In some examples, mapping the polygons and/or the points may be performed as described in relation to FIG. 1 and/or FIG. 2.

The memory 306 may store displacement determination instructions 312. In some examples, the processor 304 may execute the displacement determination instructions 312 to determine a displacement for each of the polygons based on the points. A displacement is an indication of a degree of difference. For example, a displacement may indicate a difference relative to a 3D object model and/or relative to a model point cloud. In some examples, a displacement may vary over a space, area, and/or volume. For instance, a displacement may vary over the area of a polygon (e.g., triangle). In some examples, determining the displacement for each of the polygons may be accomplished as described in connection with FIG. 1 and/or FIG. 2. In some examples, each of the polygons may be associated with a subset of the points through a point cloud of the 3D object model. For instance, each of the polygons may be associated with a subset of points of a model point cloud of the 3D object model, which may be associated with a subset of points of the compensated point cloud. In some examples, the processor 304 may determine each displacement by interpolating each subset of the points associated with each of the polygons. Interpolating each subset of the points associated with each of the polygons may produce a displacement map. For example, a displacement map may include displacements corresponding to each of the polygons.

In some examples, the processor 304 may execute the operation instructions 318 to perform an operation based on the displacements. For example, the processor 304 may print the 3D object model based on the displacements. In some examples, the processor 304 may assemble or attach the displacements (e.g., displacement map) to the 3D object model. For instance, the processor 304 may adjust the 3D model data 308 and/or printing instructions to compensate for predicted deformation in order to reduce actual deformation when the object is printed. For instance, the processor 304 may drive model setting based on a deformation-compensated 3D model. In some examples, the processor 304 may command a printing device, printhead(s), actuator(s), etc., to print the 3D object model with the assembled or attached displacements (e.g., displacement model). In some examples, the processor 304 may present the displacement(s) on a display, may store the displacement(s) in the memory 306, and/or may send the displacement(s) to another device or devices.

Figure 4:
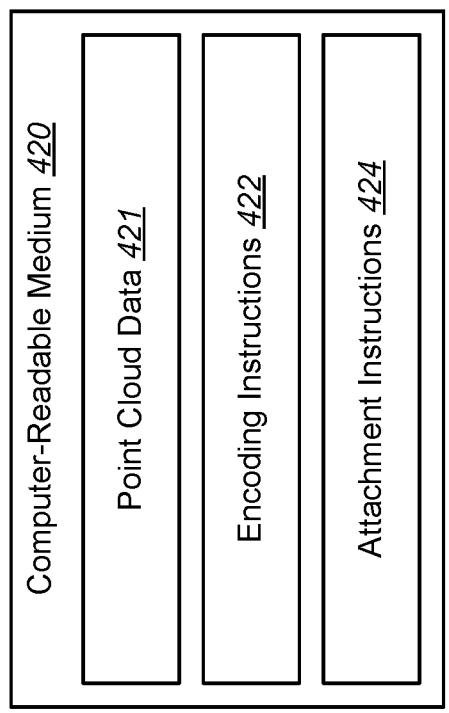
FIG. 4 is a block diagram illustrating an example of a computer-readable medium for encoding a compensated point cloud to a digital texture.

FIG. 4 is a block diagram illustrating an example of a computer-readable medium 420 for encoding a compensated point cloud to a digital texture. The computer-readable medium 420 may be a non-transitory, tangible computer-readable medium 420. The computer-readable medium 420 may be, for example, RAM, EEPROM, a storage device, an optical disc, and the like. In some examples, the computer-readable medium 420 may be volatile and/or non-volatile memory, such as DRAM, EEPROM, MRAM, PCRAM, memristor, flash memory, and the like. In some implementations, the memory 306 described in connection with FIG. 3 may be an example of the computer-readable medium 420 described in connection with FIG. 4.

The computer-readable medium 420 may include code (e.g., data and/or instructions). For example, the computer-readable medium 420 may include point cloud data 421, encoding instructions 422, and/or attachment instructions 424.

In some examples, the computer-readable medium 420 may store point cloud data 421. Some examples of point cloud data 421 include samples of a 3D object model (e.g., 3D CAD file), compensated point cloud(s), and/or scan data, etc. The point cloud data 421 may indicate the shape of a 3D object (e.g., an actual 3D object, a 3D object model, and/or a compensated 3D object model).

In some examples, the encoding instructions 422 are code to cause a processor to encode a compensated point cloud to a digital texture. In some examples, this may be accomplished as described in connection with FIG. 1, FIG. 2, and/or FIG. 3. For instance, the encoding instructions 422 may be executed to map polygons of a 3D object model to a 2D space, to determine a set of triangles within a polygon or polygons of the 3D object model, and/or to interpolate points of the compensated point cloud based on the triangles.

For example, the encoding instructions 422 may include code to cause the processor to determine a set of triangles within a polygon of the 3D object model. The set of triangles may include vertices corresponding to points of the compensated point cloud. In some examples, this may be accomplished as described in relation to FIG. 1, FIG. 2, and/or FIG. 3.

In some examples, the encoding instructions 422 may include code to cause the processor to interpolate the points based on the triangles. In some examples, this may be accomplished as described in relation to FIG. 1, FIG. 2, and/or FIG. 3.

In some examples, the attachment instructions 424 may be executed to attach the digital texture to a 3D object model for 3D object manufacturing. In some examples, this may be accomplished as described in relation to FIG. 1, FIG. 2, and/or FIG. 3.

Figure 5B:
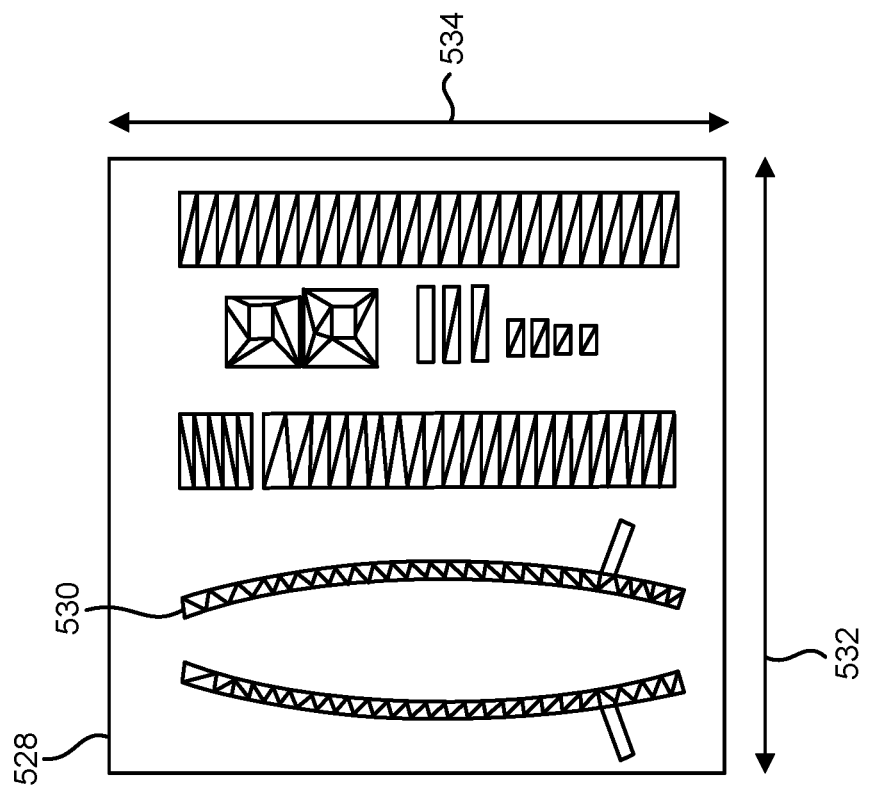
FIG. 5B is a diagram illustrating an example of a 2D space.
Figure 5A:
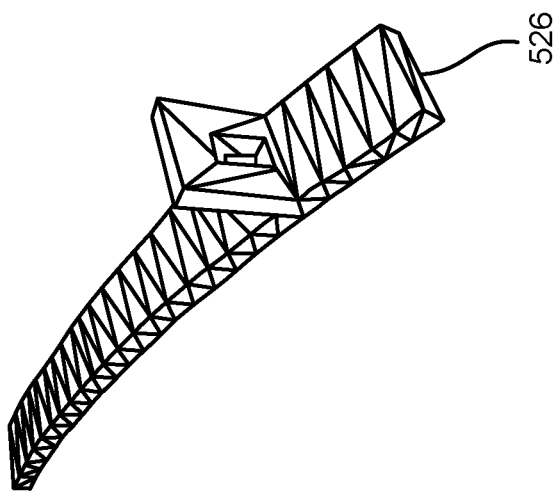
FIG. 5A is a diagram illustrating an example of a 3D object model.

FIG. 5A is a diagram illustrating an example of a 3D object model 526. As shown in FIG. 5A, a 3D object model may include polygons (e.g., CAD mesh triangles).

FIG. 5B is a diagram illustrating an example of a 2D space 528. In this example, the 2D space 528 is illustrated in a first dimension 532 and a second dimension 534. In some examples, the first dimension 532 and the second dimension 534 may be equal in size. For instance, the 2D space 528 may be a 2D unit space, where the first dimension 532 and the second dimension 534 are expressed as one unit. The 2D space 528 may be an example of a UV space, where the first dimension 532 is a U dimension and the second dimension 534 is a V dimension. In some examples, the size of the 2D space (e.g., mapping space) may be relative. For instance, the first dimension 532 and the second dimension 534 may range from 0 to 1. In some examples, the polygons in the 2D space (e.g., UV space) may be expressed in a vectorized manner.

As described herein, a 3D object model may be mapped (e.g., transformed, projected, unwrapped, etc.) to a 2D space. FIG. 5B illustrates examples of polygons 530 that are mapped into the 2D space 528 from the 3D space of the 3D object model 526 described in relation to FIG. 5A.

Figure 6A:
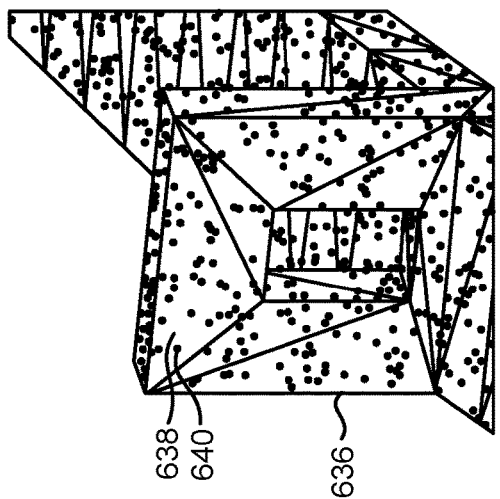
FIG. 6A is a diagram illustrating an example of a portion of the example of the 3D object model illustrated in FIG. 5A.

FIG. 6A is a diagram illustrating an example of a portion 636 of the example of the 3D object model 526 illustrated in FIG. 5A. As described herein, a point cloud may be determined from a 3D object model. Examples of points 640 of a model point cloud that is based on the 3D object model 526 are illustrated in FIG. 6A. FIG. 6A also illustrates an example of a correspondence between a polygon 638 of the 3D object model 526 and some of the points 640 of the model point cloud.

Figure 6B:
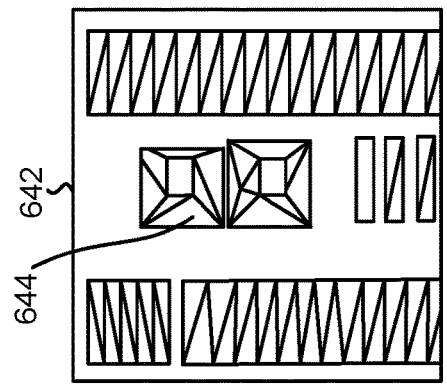
FIG. 6B is a diagram illustrating an example of a portion of the example of the 2D space described in FIG. 5B.

FIG. 6B is a diagram illustrating an example of a portion 642 of the example of the 2D space 528 described in FIG. 5B. The polygon 638 illustrated in FIG. 6A may be mapped (e.g., transformed, projected, unwrapped, etc.) to the 2D space 528 to produce a mapped polygon 644 illustrated in FIG. 6B.

Figure 6C:
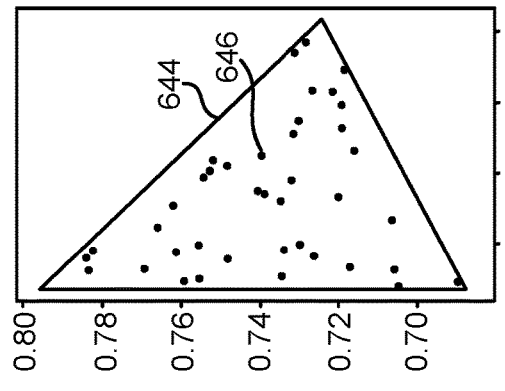
FIG. 6C is a diagram illustrating a magnified example of the mapped polygon illustrated in FIG. 6B.

FIG. 6C is a diagram illustrating a magnified example of the mapped polygon 644 illustrated in FIG. 6B. As described herein, a model point cloud may be mapped to the 2D space. Examples of points 646 of a mapped model point cloud are illustrated in FIG. 6C. FIGS. 5A-6C illustrate an example of how 3D object model polygons (e.g., CAD mesh triangles) and an associated model point cloud may be mapped to a 2D space in accordance with some of the techniques described herein. For instance, FIG. 6C illustrates an example of a mapped polygon 644 (e.g., mesh triangle) with a subset of points 646 from a mapped point cloud. In some examples, the units of the axes of FIGS. 6C-E may be expressed as a relative position within a range of 0 to 1 corresponding to the space (e.g., unwrapping space) mapping.

Figure 6D:
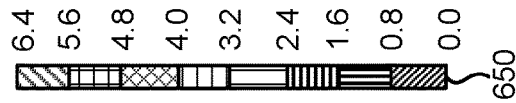
FIG. 6D is a diagram illustrating an example of the mapped polygon illustrated in FIG. 6B and FIG. 6C.
Figure 6D:
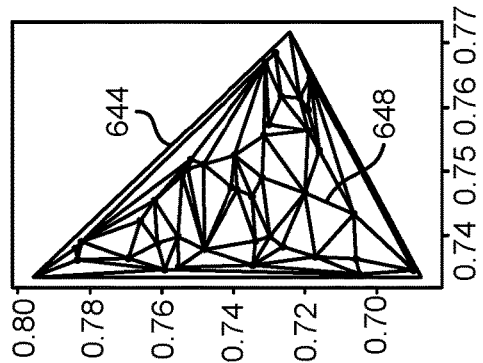

FIG. 6D is a diagram illustrating an example of the mapped polygon 644 illustrated in FIG. 6B and FIG. 6C. As described herein, a polygon may be polygonized (e.g., triangulated) based on points of a mapped model point cloud. FIG. 6D illustrates an example of polygons 648 (e.g., triangles) determined from polygonization, where points 646 of the mapped model point cloud are connected to form the polygons 648. For example, a Delaunay triangulation may be performed on the mapped polygon 644 based on the mapped points 646.

Figure 6E:
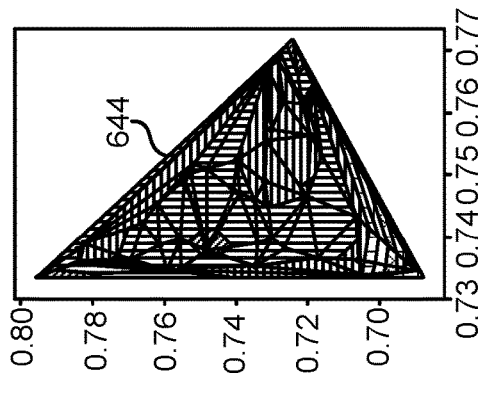
FIG. 6E is a diagram illustrating an example of the mapped polygon with an interpolation over the polygonization.

FIG. 6E is a diagram illustrating an example of the mapped polygon 644 with an interpolation over the polygonization. For instance, the polygonization (e.g., triangulation) illustrated in FIG. 6D may be utilized to perform an interpolation (e.g., infer a linear interpolation over the triangles in the mapped polygon 644). The scale 650 in FIG. 6E illustrates a degree (e.g., distance) of displacement over the polygons 648 in the mapped polygon 644. The scale 650 is illustrated in millimeters (mm) in the example of FIG. 6E. Polygons (e.g., 3D triangles) may be interpolated to produce a displacement map.

Figures 7A, 7B:
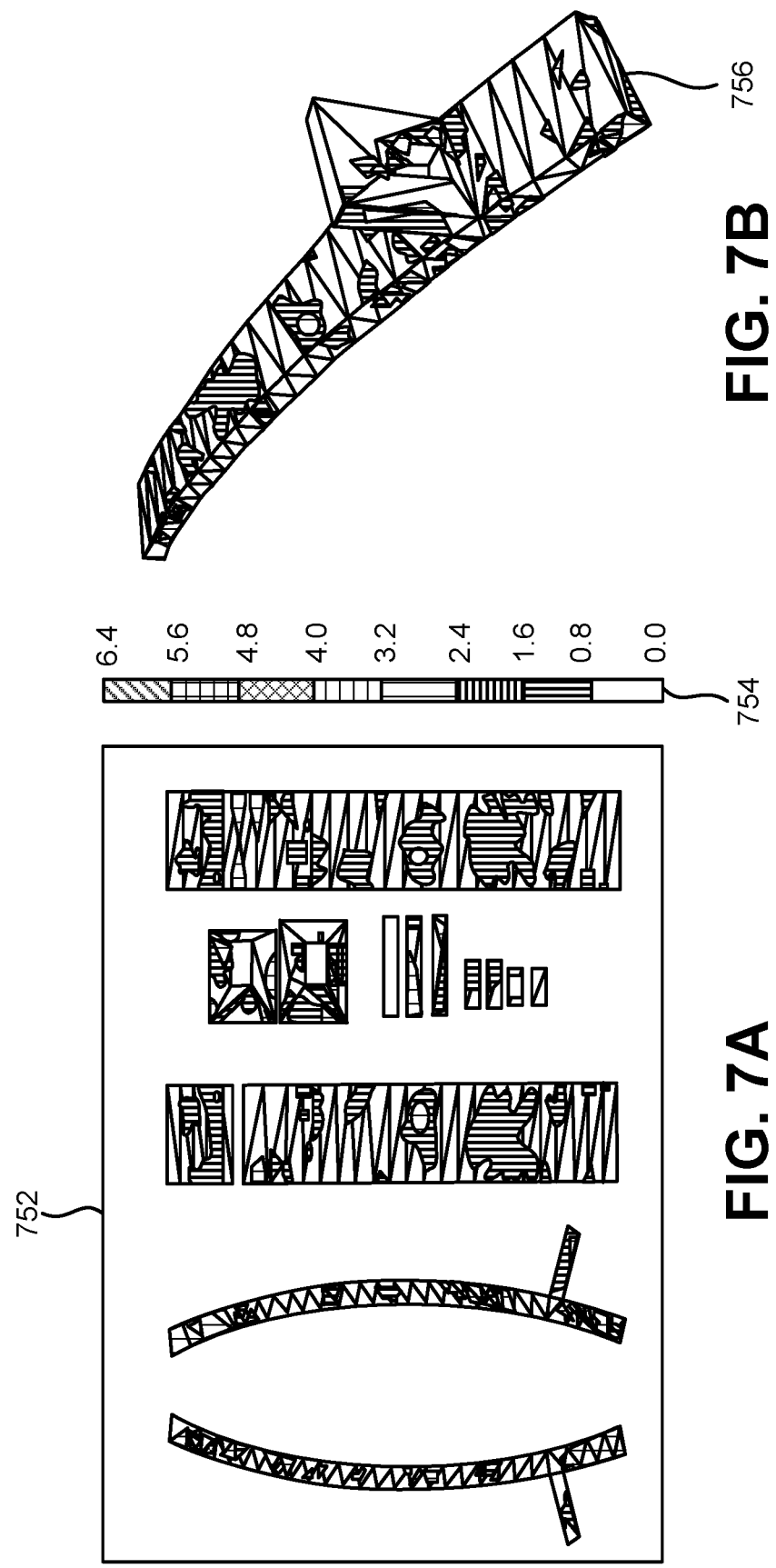
FIG. 7A is a diagram illustrating an example of a displacement map.
FIG. 7B is a diagram illustrating an example of a compensated 3D object model with an assembled displacement map.

FIG. 7A is a diagram illustrating an example of a displacement map 752. The displacement map 752 may include displacements as described herein. In FIG. 7A, the displacements are shown according to a scale 754 in mm. FIGS. 6D-7A illustrate an example of how 3D triangles may be interpolated at the mapped coordinates to generate a displacement map 752. In the example shown in FIG. 7A, the scale 754 indicates the distance displacement that each triangle is to be transformed.

FIG. 7B is a diagram illustrating an example of a compensated 3D object model 756 with an assembled displacement map. As described herein, a displacement map may be assembled on (e.g., attached to, mapped to, etc.) a 3D object model to produce a compensated 3D object model 756. FIG. 7B illustrates the displacement map 752 of FIG. 7A assembled on the 3D object model 526 of FIG. 5A to produce the compensated 3D object model 756. For instance, some of the techniques described herein may be utilized to assign a digital texture for a 3D print. By printing objects according to a compensated 3D object model (e.g., compensated CAD design), the actual deformation in the printing process may be reduced or minimized to provide more accurate geometry of a 3D object after manufacturing. In the example shown in FIG. 7B, each triangle may be transformed with a displacement distance(s) in accordance with the scale 754 of FIG. 7A.

Some examples of the techniques disclosed herein may be beneficial. For example, some of the techniques may be utilized in a compensation pipeline, which may be automated from the 3D object model to manufacturing the 3D object. Some of the techniques may improve geometrical accuracy for manufactured objects. Some examples of geometric compensation may be data driven. As more data are collected from manufactured objects, increased prediction accuracy may be achieved. For instance, a prediction model (e.g., a point cloud deep neural network) may be platform independent, being able to learn geometric deformation independent of a 3D printer model. Some of the techniques described herein may utilize data from a simulated object deformation based on simulated physical processes and/or object deformation assessed from an actual printed object or objects. Some of the techniques utilized herein may utilize object compensation expressed as a compensation point cloud. For example, some of the techniques described herein may encode compensation information into a printable format (e.g., 3D Manufacturing Format (3MF)) ready for sending to a 3D printer.

While various examples of systems and methods are described herein, the systems and methods are not limited to the examples. Variations of the examples described herein may be implemented within the scope of the disclosure. For example, operations, functions, aspects, or elements of the examples described herein may be omitted or combined.

The invention claimed is:

1. A method, comprising:
   determining a displacement map by mapping a three-dimensional (3D) object model to a two-dimensional (2D) space based on a compensated point cloud to predict deformation in the 3D object model, wherein the compensated point cloud is generated by applying a machine learning model trained on deformation data of previously manufactured objects to predict deformation in the 3D object model, and wherein mapping the 3D object model to the 2D space comprises assigning a coordinate in the 2D space for each vertex of the 3D object model;
   assembling the displacement map on the 3D object model to adjust the 3D object model to compensate for the predicted deformation by mapping the displacement map to the 3D object as a digital texture; and
   printing the 3D object model with the digital texture.

2. The method of claim 1, further comprising mapping the compensated point cloud to the 2D space to produce a mapped point cloud.

3. The method of claim 2, wherein determining the displacement map comprises triangulating points of the mapped point cloud corresponding to a mapped polygon from the 3D object model in the 2D space.

4. The method of claim 3, wherein determining the displacement map comprises interpolating the triangulation.

5. The method of claim 1, wherein the displacement map comprises a set of polygons, wherein each polygon comprises an interpolation of a set of compensated points of the compensated point cloud.

6. The method of claim 5, wherein the interpolation indicates a varying degree of compensation over a corresponding polygon.

7. The method of claim 1, wherein mapping the 3D object model to 2D space comprises performing UV projection of the 3D object model into the 2D space.

8. An apparatus, comprising:
   a memory; and
   a processor in electronic communication with the memory, wherein the processor is to:
   map polygons of a three-dimensional (3D) object model and points of a compensated point cloud to a two-dimensional (2D) space to predict deformation in the 3D object model, wherein the compensated point cloud is generated by applying a machine learning model trained on deformation data of previously manufactured objects to predict deformation in the 3D object model;
   determine a displacement for each of the polygons based on the points, wherein the displacements are used to adjust the 3D object model to compensate for the predicted deformation by applying the displacement for each of the polygons as a digital texture to the 3D object model; and
   print the 3D object model based on the displacements.

9. The apparatus of claim 8, wherein each of the polygons is associated with a subset of the points through a point cloud of the 3D object model.

10. The apparatus of claim 9, wherein the processor is to determine each displacement by interpolating each subset of the points associated with each of the polygons.

11. A non-transitory tangible computer-readable medium storing executable code, comprising:
   code to cause a processor to encode a compensated point cloud to a digital texture to predict deformation in a three-dimensional (3D) object model, wherein the compensated point cloud is a mapped point cloud and is generated by applying a machine learning model trained on deformation data of previously manufactured objects to predict deformation in the 3D object model, and wherein the digital texture is determined by mapping the 3D object model to a two-dimensional (2D) space by assigning a coordinate in the 2D space for each vertex of the 3D object model;
   code to cause the processor to attach the digital texture to the 3D object model based on the compensated point cloud to adjust the 3D object model to compensate for the predicted deformation; and
   code to cause the processor to print the 3D object model with the digital texture.

12. The computer-readable medium of claim 11, wherein the code to cause the processor to encode the compensated point cloud comprises:
   code to cause the processor to determine a set of triangles within a polygon of the 3D object model, wherein the set of triangles comprises vertices corresponding to points of the compensated point cloud; and
   code to cause the processor to interpolate the points based on the set of triangles.

13. The computer-readable medium of claim 11, wherein the digital texture comprises a displacement map that is wrapped around the 3D object model.

* * * * *